(12) United States Patent
Bradfield

(10) Patent No.: US 10,879,750 B2
(45) Date of Patent: Dec. 29, 2020

(54) CLAW POLE HAVING SHAPED CLAW POLE SEGMENTS

(71) Applicant: Michael D. Bradfield, Anderson, IN (US)

(72) Inventor: Michael D. Bradfield, Anderson, IN (US)

(73) Assignee: BORG WARNER INC., Auburn Hills, MI (US)

( * ) Notice: Subject to any disclaimer, the term of this patent is extended or adjusted under 35 U.S.C. 154(b) by 217 days.

(21) Appl. No.: 16/178,416

(22) Filed: Nov. 1, 2018

(65) Prior Publication Data

US 2019/0140498 A1    May 9, 2019

Related U.S. Application Data

(60) Provisional application No. 62/582,093, filed on Nov. 6, 2017.

(51) Int. Cl.
*H02K 1/24* (2006.01)
*H02K 21/04* (2006.01)
*H02K 7/10* (2006.01)

(52) U.S. Cl.
CPC .......... *H02K 1/243* (2013.01); *H02K 7/1008* (2013.01); *H02K 21/044* (2013.01)

(58) Field of Classification Search
CPC ..... H02K 1/243; H02K 7/1008; H02K 21/044
See application file for complete search history.

(56) References Cited

U.S. PATENT DOCUMENTS

| 5,270,605 | A | * | 12/1993 | Lefrancois | H02K 19/22 310/263 |
| 5,306,977 | A | * | 4/1994 | Hayashi | H02K 1/243 310/192 |
| 5,543,676 | A | * | 8/1996 | York | H02K 1/243 310/152 |
| 5,708,318 | A | * | 1/1998 | Fudono | H02K 1/243 310/263 |
| 6,114,793 | A | * | 9/2000 | Asao | H02K 9/06 310/263 |
| 6,545,383 | B1 | * | 4/2003 | York | H02K 1/243 310/261.1 |
| 6,710,506 | B2 | * | 3/2004 | Ishizuka | H02K 1/243 310/263 |

(Continued)

*Primary Examiner* — Robert W Horn
(74) *Attorney, Agent, or Firm* — Cantor Colburn LLP

(57) ABSTRACT

A claw pole member for an electric machine including a plurality of claw pole segments. Each of the plurality of claw pole segments includes a radial projecting member, an axial outer surface extending to a cantilevered end portion, and an axial inner surface extending axially outwardly of the radial projecting member to a cantilevered end section. A first side surface extends between the axial outer surface and the axial inner surface from the radial projecting member to the cantilevered end portion and the cantilevered end section, and a second side surface extends between the axial outer surface and the axial inner surface from the radial projecting member to the cantilevered end portion and the cantilevered end section. The first and second side surfaces define a taper of the claw pole segment. Each of the first and second side surfaces includes a recessed portion that extends into the claw pole segment.

20 Claims, 4 Drawing Sheets

(56) References Cited

U.S. PATENT DOCUMENTS

| | | | | |
|---|---|---|---|---|
| 6,806,617 | B1* | 10/2004 | Chen | H02K 1/243 |
| | | | | 310/263 |
| 7,583,005 | B2* | 9/2009 | York | H02K 3/528 |
| | | | | 310/263 |
| 8,629,597 | B2* | 1/2014 | Bradfield | H02K 1/325 |
| | | | | 310/263 |
| 9,362,808 | B2* | 6/2016 | Usami | H02K 15/022 |
| 9,755,464 | B2* | 9/2017 | Sekiyama | H02K 1/243 |
| 10,193,404 | B2* | 1/2019 | Delianne | H02K 1/226 |
| 2002/0153803 | A1* | 10/2002 | Pflueger | H02K 1/243 |
| | | | | 310/263 |
| 2019/0140498 | A1* | 5/2019 | Bradfield | H02K 21/044 |
| 2020/0161910 | A1* | 5/2020 | Takahashi | H02P 9/30 |

* cited by examiner

CLAW POLE HAVING SHAPED CLAW POLE SEGMENTS

CROSS REFERENCE TO RELATED APPLICATIONS

This application claims the benefit of an earlier filing date from U.S. Provisional Application Ser. No. 62/582,093 filed Nov. 6, 2017, the entire disclosure of which is incorporated herein by reference.

BACKGROUND OF THE INVENTION

Exemplary embodiments pertain to the art of electric machines and, more particularly, to a claw pole having shaped claw pole segments.

Various electric machines employ a 'claw-pole' field system. The claw pole field system utilizes a shaped iron core that may produce a multi-pole field from a single coil winding. Poles of the claw pole system have a generally trapezoidal geometry that interlock with each other when assembled. Sides of each adjacent pole are parallel to one another and form a uniform gap. The single coil winding is mounted axially inside the poles. Rotation of the claw pole field system within a stator winding may produce an electric current. The electric current may be employed to power various electric systems and/or provide a charging current to an energy storage device.

BRIEF DESCRIPTION OF THE INVENTION

Disclosed is a claw pole member for an electric machine including a body having a field coil support surface and a plurality of claw pole segments extending radially outwardly of the body. Each of the plurality of claw pole segments includes a radial projecting member extending radially outwardly of the field coil support surface, an axial outer surface extending axially outwardly of the radial projecting member to a cantilevered end portion, and an axial inner surface extending axially outwardly of the radial projecting member to a cantilevered end section. The axial inner surface is spaced from the axial outer surface. A first side surface extends between the axial outer surface and the axial inner surface from the radial projecting member to the cantilevered end portion and the cantilevered end section, and a second side surface extends between the axial outer surface and the axial inner surface from the radial projecting member to the cantilevered end portion and the cantilevered end section. The first and second side surfaces define a taper of the claw pole segment, wherein each of the first and second side surfaces includes a recessed portion that extends into the claw pole segment.

Also disclosed is a claw pole assembly including a first claw pole member having a first body including a first field coil support surface and a first plurality of claw pole segments extending radially outwardly of the first body. Each of the first plurality of claw pole segments is spaced from one another by a first gap. A second claw pole member includes a second body having a second field coil support surface and a second plurality of claw pole segments extending radially about the second body. Each of the second plurality of claw pole segments is spaced from one another by a second gap. The first claw pole member is arranged opposite the second claw pole member with each of the first plurality of claw pole segments projecting into a corresponding second gap and each of the second plurality of claw pole segments projecting into a corresponding first gap. Each of the first and second plurality of claw pole segments includes a radial projecting member extending radially outwardly of respective ones of the first and second field coil support surfaces, an axial outer surface extending axially outwardly of the radial projecting member to a cantilevered end portion, and an axial inner surface extending axially outwardly of the radial projecting member to a cantilevered end section. The axial inner surface is spaced from the axial outer surface. A first side surface extends between the axial outer surface and the axial inner surface from the radial projecting member to the cantilevered end portion and the cantilevered end section, and a second side surface extends between the axial outer surface and the axial inner surface from the radial projecting member to the cantilevered end portion and the cantilevered end section. The first and second side surfaces define a taper of the claw pole segment. Each of the first and second side surfaces includes a recessed portion that extends into the claw pole segment.

Further disclosed is an electric machine including a housing, a stator fixedly mounted relative to the housing, and a rotor rotatably mounted relative to the housing. The rotor includes a claw pole assembly including a first claw pole member having a first body including a first field coil support surface and a first plurality of claw pole segments extending radially outwardly of the first body. Each of the first plurality of claw pole segments is spaced from one another by a first gap. A second claw pole member includes a second body having a second field coil support surface and a second plurality of claw pole segments extending radially about the second body. Each of the second plurality of claw pole segments is spaced from one another by a second gap. The first claw pole member is arranged opposite the second claw pole member with each of the first plurality of claw pole segments projecting into a corresponding second gap and each of the second plurality of claw pole segments projecting into a corresponding first gap. Each of the first and second plurality of claw pole segments includes a radial projecting member extending radially outwardly of respective ones of the first and second field coil support surfaces, an axial outer surface extending axially outwardly of the radial projecting member to a cantilevered end portion, and an axial inner surface extending axially outwardly of the radial projecting member to a cantilevered end section. The axial inner surface is spaced from the axial outer surface. A first side surface extends between the axial outer surface and the axial inner surface from the radial projecting member to the cantilevered end portion and the cantilevered end section, and a second side surface extends between the axial outer surface and the axial inner surface from the radial projecting member to the cantilevered end portion and the cantilevered end section. The first and second side surfaces define a taper of the claw pole segment, wherein each of the first and second side surfaces includes a recessed portion that extends into the claw pole segment.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
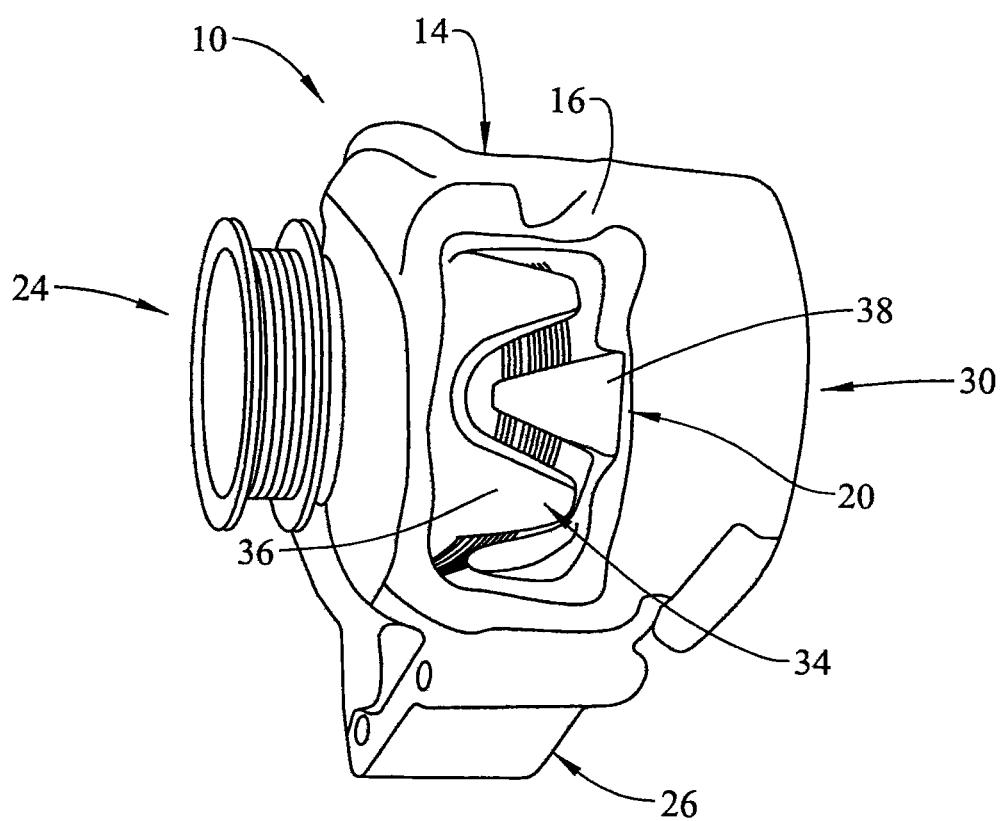
FIG. 1 depicts a partially cut-away view of an electric machine including a claw pole assembly having claw pole segments, in accordance with an aspect of an exemplary embodiment.

An electric machine, in accordance with an aspect of an exemplary embodiment, is indicated generally at 10 in FIG. 1. Electric machine 10 may take the form of a vehicle alternator. Electric machine 10 includes a housing 14 that supports a stator 16. A rotor 20 is rotatably mounted radially inwardly of stator 16. Rotor 20 may be connected to a pulley 24. Pulley 24 may be driven by a vehicle component, such as a prime mover (not shown), through a belt (also not shown). Housing 14 includes a mounting bracket 26 that may support electric machine 10 to the prime mover. In addition to supporting stator 16 and rotor 20, housing 14 may support a voltage regulator 30 that may condition voltage and/or current passing from electric machine 10.

In accordance with an aspect of an exemplary embodiment, rotor 20 takes the form of a claw pole assembly 34 formed from a first claw pole member 36 and a second claw pole member 38. First and second claw pole members 36 and 38 support a field coil (not shown) that is rotated relative to stator 16 to produce an electric current. As each claw pole member 36, 38 is similarly formed, a detailed description will follow referencing FIGS. 2-5 in describing first claw pole member 36, with an understanding that second claw pole member 38 may include a substantially identical structure.

Figure 2:
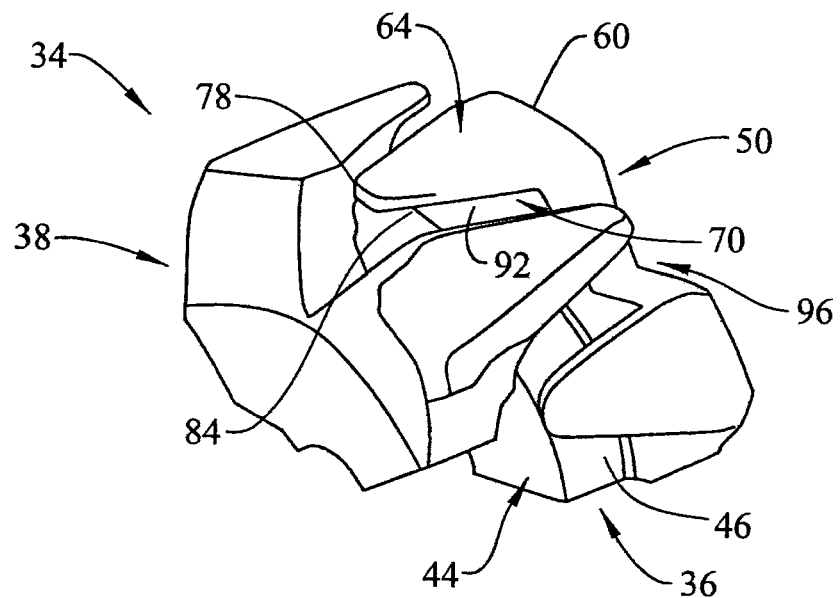
FIG. 2 depicts a partial perspective view of the claw pole assembly of FIG. 1.
Figure 3:
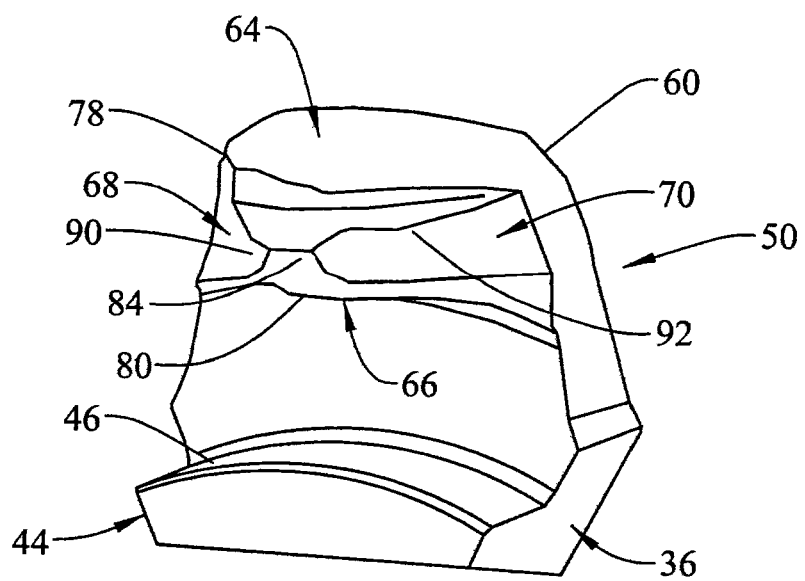
FIG. 3 depicts a perspective view of a claw pole segment, in accordance with an aspect of an exemplary embodiment.
Figure 4:
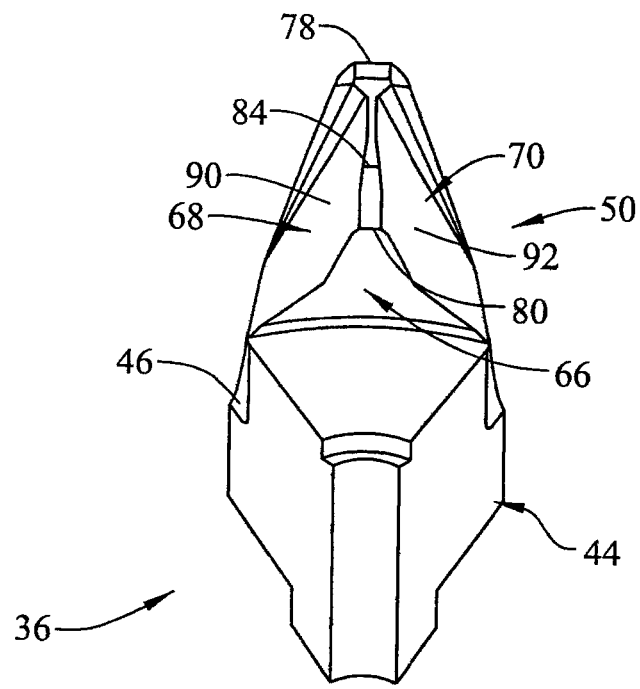
FIG. 4 depicts a partial perspective view of a axial inner surface of the claw pole segment of FIG. 3.
Figure 5:
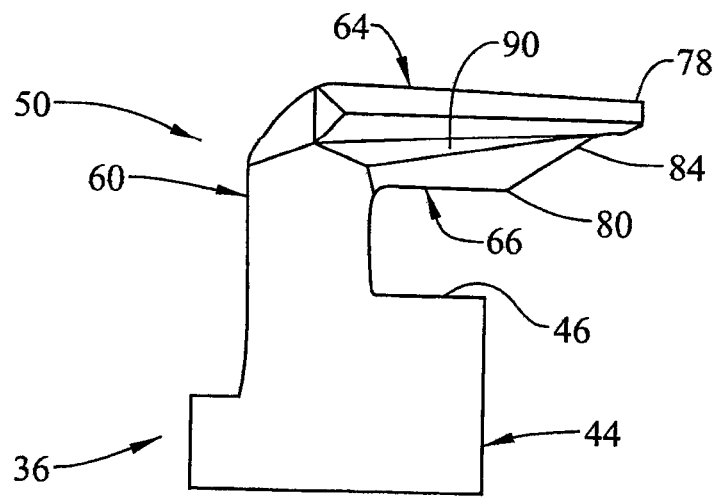
FIG. 5 depicts a side view of the claw pole segment of FIG. 3.

Referring to FIG. 2, first claw pole member 36 includes a body 44 having a field coil support surface 46 that supports the field coil (not shown). A plurality of claw pole segments, one of which is indicated at 50, project radially outwardly of body 44. Referring to FIGS. 3-5 and with continued reference to FIG. 2, each claw pole segment 50 includes a radial projecting member 60 that extends radially outwardly of field coil support surface 46. An axial outer surface 64 projects axially outwardly of radial projecting member 60. An axial inner surface 66 also projects axially outwardly of radial projecting member 60 radially inwardly of, and spaced from, axial outer surface 64. In an embodiment, axial inner surface 66 is substantially co-axial with field coil support surface 46. At this point it should be understood that the term "radial" is meant to describe a direction along a radius of rotor 20 and "axial" is meant to describe a direction along an axis of rotation of rotor 20.

In accordance with an exemplary aspect, each claw pole segment 50 also includes a first side surface 68 and a second side surface 70. First side surface 68 extends axially from radial projecting member 60 to a cantilevered end section 78 between axial outer surface 64 and axial inner surface 66. Second side surface 70 extends axially from radial projecting member 60 to a cantilevered end portion 80 between axial outer surface 64 and axial inner surface 66. An angled tip surface portion 84 extends between and connects cantilevered end section 78 and cantilevered end portion 80.

In still further accordance with an exemplary aspect, first side surface 68 includes a first recessed portion 90 and second side surface 70 includes a second recessed portion 92. First and second recessed portions 90 and 92 taper from radial projecting member 60 to angled tip surface portion 84. First and second recessed portions 90 and 92 appear as if first and second side surfaces 68 and 70 have been "pinched". First and second recessed portions 90 and 92 cause a mass moment of inertia of each claw pole segment 50 to shift from an outer diameter (axial outer surface 64) radially inwardly. The movement of the moment of inertia radially inwardly reduces a mechanical load and drag that may be imposed on the prime mover through electric machine 10.

Figure 6:
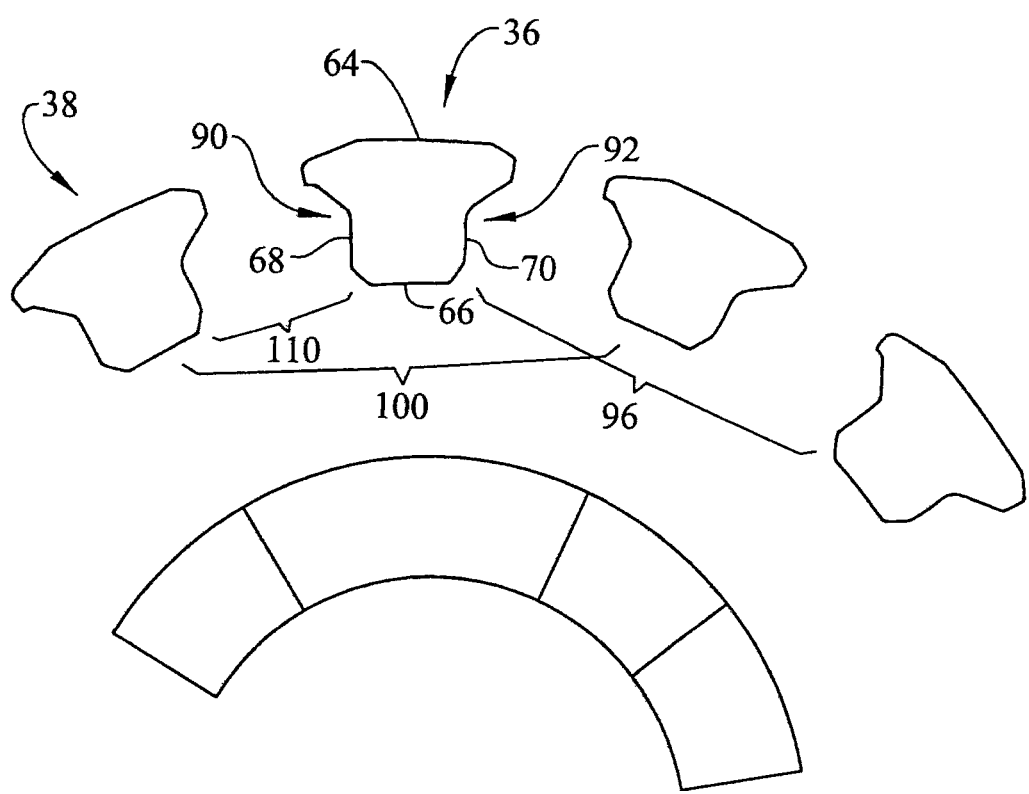
FIG. 6 depicts a partial cross-sectional view of the claw pole assembly, in accordance with an aspect of an exemplary embodiment.

In accordance with still yet another aspect of an exemplary embodiment, a segment to segment gap 96 is defined between adjacent claw pole segments 50 as shown in FIG. 6. As a result of first and second recessed portions 90 and 92, segment gap 96 includes a variable dimension. That is, a distance between corresponding axial outer surfaces 64 may define a first dimension; a distance between adjacent axial inner surfaces 66 may define a second dimension that is distinct from the first dimension, and a distance between adjacent side surfaces may also be variable. That is, segment gap 96 is defined by two substantially non-parallel surfaces. A similar segment gap indicated at 100, also defined by two substantially non-parallel surfaces, may exist between adjacent claw pole segments (not separately labeled) of second claw pole member 38. Further, a gap 110 between claw pole segments 50 and the claw pole segments of second claw pole member 38 also include a variable dimension defined by two substantially non-parallel surfaces.

It should be understood that the first and second recesses provided in the first and second side portions provide enhanced operational parameters of the electric machine. For example, in addition to other benefits discussed herein, by moving the mass moment of inertia radially inwardly, pole deflection in response to a centrifugal force developed during rotation of rotor 20 may be reduced. Additionally, the first and second recessed portions reduce pole-to-pole flux leakage. By reducing pole-to-pole flux leakage, the electric machine may be configured to generate more current or may keep output current substantially more constant over a greater speed range by reducing the amount of conductive material needed to form each claw pole segment.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A claw pole member for an electric machine comprising:
    a body including a field coil support surface and a plurality of claw pole segments extending radially outwardly of the body, each of the plurality of claw pole segments comprising:
        a radial projecting member extending radially outwardly of the field coil support surface;
        an axial outer surface extending axially outwardly of the radial projecting member to a cantilevered end portion;
        an axial inner surface extending axially outwardly of the radial projecting member to a cantilevered end section, the axial inner surface being spaced from the axial outer surface;
        a first side surface extending between the axial outer surface and the axial inner surface from the radial projecting member to the cantilevered end portion and the cantilevered end section; and
        a second side surface extending between the axial outer surface and the axial inner surface from the radial projecting member to the cantilevered end portion and the cantilevered end section, the first and second side surfaces defining a taper of the claw pole segment, wherein each of the first and second side surfaces includes a recessed portion that extends into the claw pole segment.

2. The claw pole member according to claim 1, wherein the first and second side surface taper from the radial projecting member to the cantilevered end portion and the cantilevered end section.

3. The claw pole member according to claim 1, further comprising: an angled tip surface portion extending between the cantilevered end portion and the cantilevered end section.

4. The claw pole member according to claim 1, wherein the axial inner surface and the field coil support surface are substantially co-axial.

5. The claw pole member according to claim 1, wherein each of the plurality of claw pole segments is spaced from an adjacent one of the plurality of claw pole segments by a gap having a variable dimension.

6. A claw pole assembly comprising:
    a first claw pole member including first body including a first field coil support surface and a first plurality of claw pole segments extending radially outwardly of the first body, each of the first plurality of claw pole segments being spaced from one another by a first gap;
    a second claw pole member including a second body having a second field coil support surface and a second plurality of claw pole segments extending radially about the second body, each of the second plurality of claw pole segments being spaced from one another by a second gap, the first claw pole member being arranged opposite the second claw pole member with each of the first plurality of claw pole segments projecting into a corresponding second gap and each of the second plurality of claw pole segments projecting into a corresponding first gap, wherein each of the first and second plurality of claw pole segments comprises:
        a radial projecting member extending radially outwardly of respective ones of the first and second field coil support surfaces;
        an axial outer surface extending axially outwardly of the radial projecting member to a cantilevered end portion;
        an axial inner surface extending axially outwardly of the radial projecting member to a cantilevered end section, the axial inner surface being spaced from the axial outer surface;
        a first side surface extending between the axial outer surface and the axial inner surface from the radial projecting member to the cantilevered end portion and the cantilevered end section; and
        a second side surface extending between the axial outer surface and the axial inner surface from the radial projecting member to the cantilevered end portion and the cantilevered end section, the first and second side surfaces defining a taper of the claw pole segment, wherein each of the first and second side surfaces includes a recessed portion that extends into the claw pole segment.

7. The claw pole assembly according to claim 6, wherein the first and second side surface taper from the radial projecting member to the cantilevered end portion and the cantilevered end section.

8. The claw pole assembly according to claim 6, further comprising: an angled tip surface portion extending between the cantilevered end portion and the cantilevered end section.

9. The claw pole assembly according to claim 6, wherein the axial inner surface and the respective ones of the first and second field coil support surfaces are substantially co-axial.

10. The claw pole assembly according to claim 6, wherein each of first plurality of claw pole segments is spaced from a corresponding one of the second plurality of claw pole segments by a third gap having a variable dimension defined by two substantially non-parallel surfaces.

11. The claw pole assembly according to claim 6, wherein the first gap includes a first variable dimension and the second gap includes a second variable dimension.

12. The claw pole assembly according to claim 11, wherein the first variable dimension is substantially similar to the second variable dimension.

13. An electric machine comprising:
    a housing;
    a stator fixedly mounted relative to the housing; and
    a rotor rotatably mounted relative to the housing, the rotor including a claw pole assembly comprising:
        a first claw pole member including first body including a first field coil support surface and a first plurality of claw pole segments extending radially outwardly of the first body, each of the first plurality of claw pole segments being spaced from one another by a first gap;
        a second claw pole member including a second body having a second field coil support surface and a second plurality of claw pole segments extending radially about the second body, each of the second plurality of claw pole segments being spaced from one another by a second gap, the first claw pole member being arranged opposite the second claw pole member with each of the first plurality of claw pole segments projecting into a corresponding second gap and each of the second plurality of claw pole segments projecting into a corresponding first gap, wherein each of the first and second plurality of claw pole segments comprises:
- a radial projecting member extending radially outwardly of respective ones of the first and second field coil support surfaces;
- an axial outer surface extending axially outwardly of the radial projecting member to a cantilevered end portion;
- an axial inner surface extending axially outwardly of the radial projecting member to a cantilevered end section, the axial inner surface being spaced from the axial outer surface;
- a first side surface extending between the axial outer surface and the axial inner surface from the radial projecting member to the cantilevered end portion and the cantilevered end section; and
- a second side surface extending between the axial outer surface and the axial inner surface from the radial projecting member to the cantilevered end portion and the cantilevered end section, the first and second side surfaces defining a taper of the claw pole segment, wherein each of the first and second side surfaces includes a recessed portion that extends into the claw pole segment.

14. The electric machine according to claim 13, wherein the first and second side surface taper from the radial projecting member to the cantilevered end portion and the cantilevered end section.

15. The electric machine according to claim 13, further comprising: an angled tip surface portion extending between the cantilevered end portion and the cantilevered end section.

16. The electric machine according to claim 13, wherein the axial inner surface and the respective ones of the first and second field coil support surfaces are substantially co-axial.

17. The electric machine according to claim 13, wherein each of first plurality of claw pole segments is spaced from a corresponding one of the second plurality of claw pole segments by a third gap having a variable dimension defined by two substantially non-parallel surfaces.

18. The electric machine according to claim 13, wherein the first gap includes a first variable dimension and the second gap includes a second variable dimension.

19. The electric machine according to claim 18, wherein the first variable dimension is substantially similar to the second variable dimension.

20. The electric machine according to claim 13, wherein the electric machine defines a motor vehicle alternator.

* * * * *